UNITED STATES PATENT OFFICE.

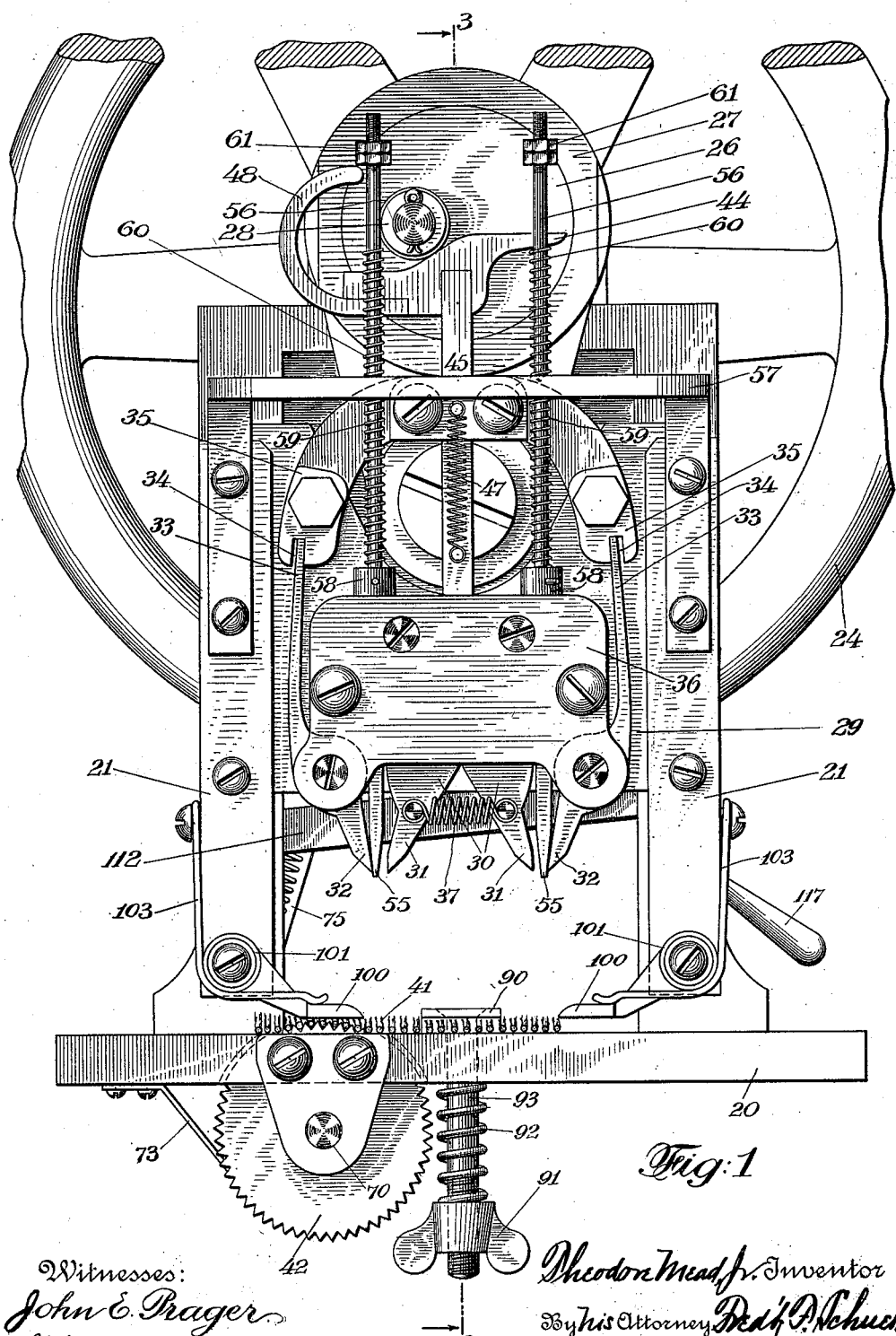

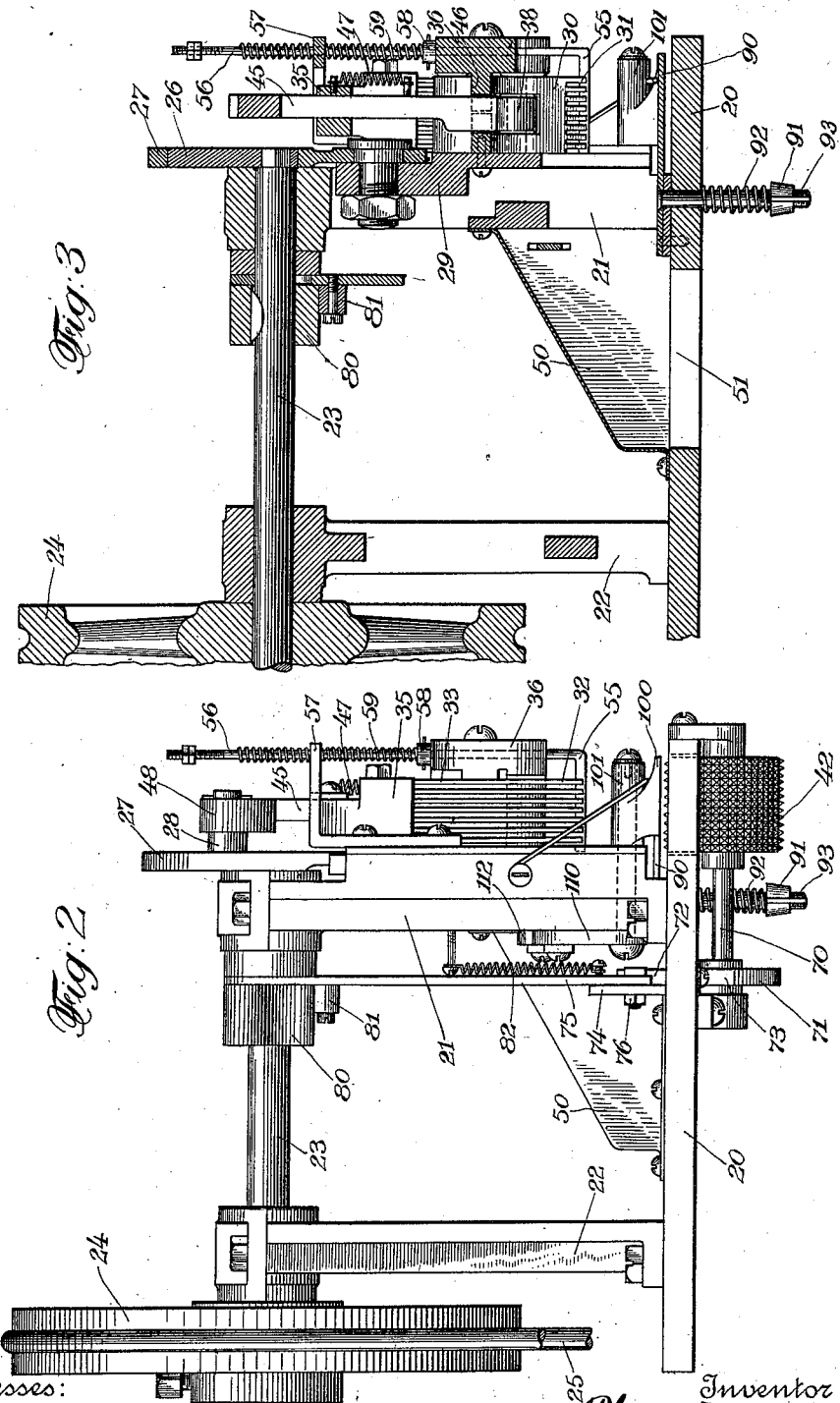

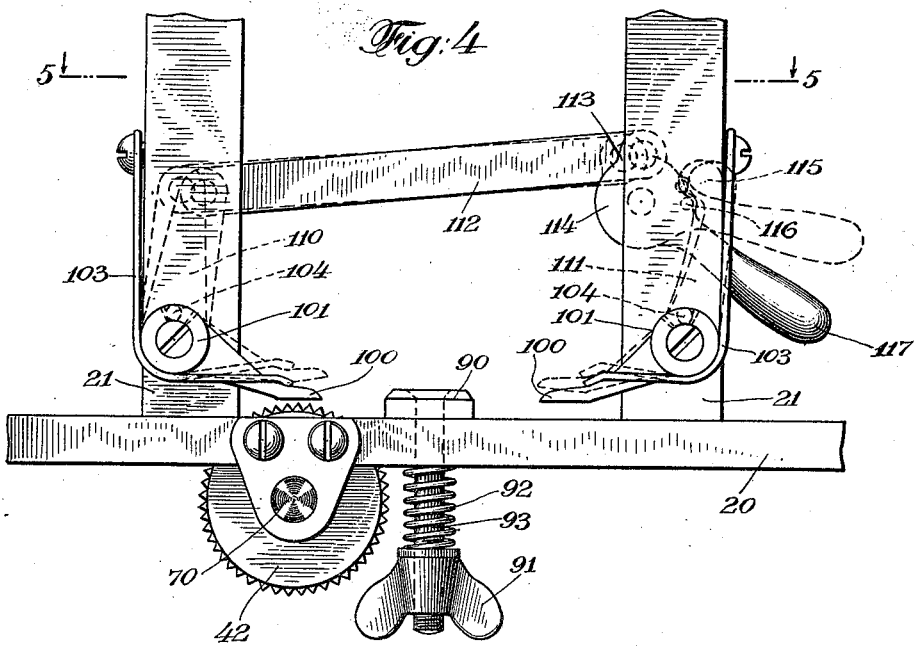
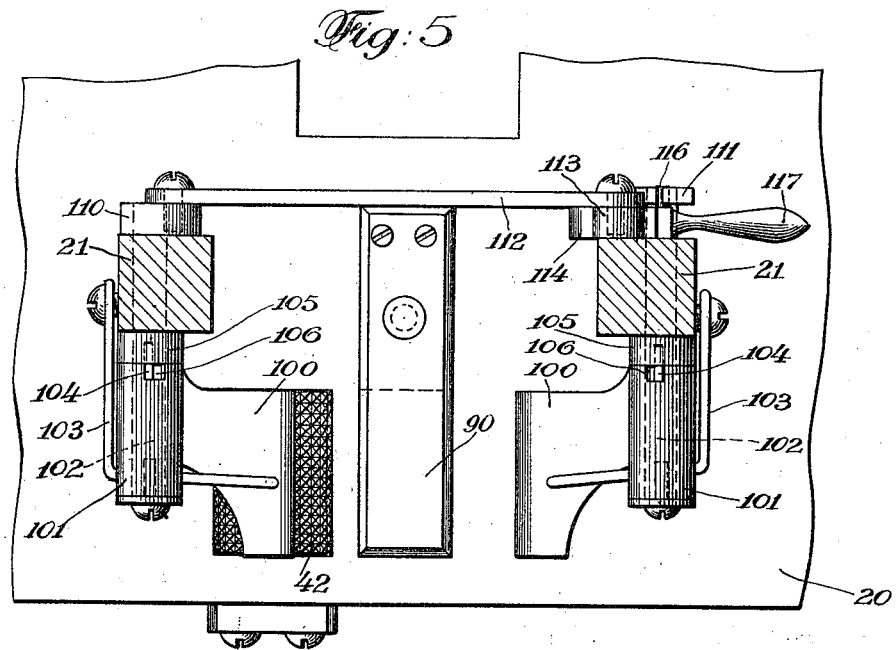

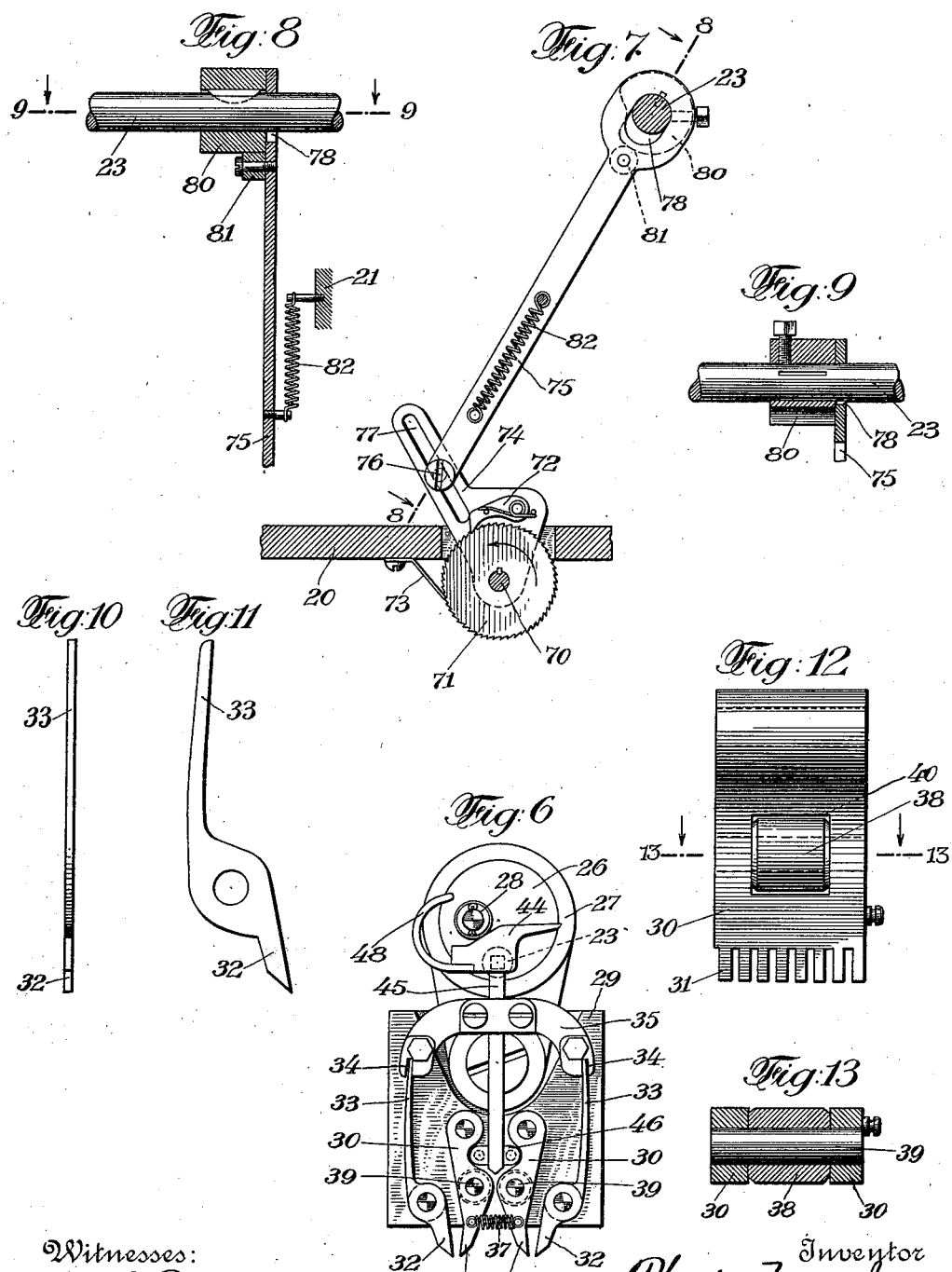

THEODORE MEAD. JR., OF EAST ORANGE, NEW JERSEY. ASSIGNOR OF ONE-HALF TO GEORGE T. JANCOVIUS, OF NEWARK, NEW JERSEY.

NAP-PLUCKING MACHINE.

1,000,616.　　　　　Specification of Letters Patent.　Patented Aug. 15, 1911.

Application filed February 9, 1910.　Serial No. 542,903.

*To all whom it may concern:*

Be it known that I, THEODORE MEAD, Jr., a citizen of the United States, and a resident of East Orange, in the county of Essex and State of New Jersey, have invented certain new and useful Improvements in Nap-Plucking Machines, of which the following is a specification.

My invention relates to machines for removing nap from carpets and the like; and it has for its object a machine so constructed and arranged as to rapidly pluck the nap from the edge of a carpet or rug such as Axminster carpet and the like, and to provide means whereby the nap so plucked can be conveniently removed.

It has for its further object to allow of the use, with the same machine, of different thickness of carpet; and, also to provide means whereby said carpet is automatically fed under the picking jaws of the machine.

The nature of my invention will be best understood when described in connection with the accompanying drawings, in which—

Figure 1 is a front elevation of the improved nap plucking machine. Fig. 2 is a side elevation of said machine. Fig. 3 is a vertical section taken on the line 3—3, Fig. 1, looking in the direction of the arrows. Fig. 4 is a fragmentary elevation. Fig. 5 is a horizontal section taken on the line 5—5, Fig. 4, looking in the direction of the arrows. Fig. 6 is an elevation, on a reduced scale, of the machine and shows the reciprocating frame and operating mechanism therefor, as well as the two gangs of picker jaws. Figs. 7, 8, and 9 are detail views illustrating the carpet advancing mechanism; Fig. 8 being a section taken on the line 8—8, Fig. 7, looking in the direction of the arrows; and Fig. 9 a section taken on the line 9—9, Fig. 8, looking in the direction of the arrows. Figs. 10 and 11 are respectively a side and front elevation of a picker member. Fig. 12 is a side elevation of a gang of the picker members coöperating with the members illustrated in Figs. 10 and 11. Fig. 13 is a horizontal section taken on the line 13—13, Fig. 12, looking in the direction of the arrows.

Similar characters of reference designate corresponding parts throughout the several views.

Referring now to the drawings, 20 designates the bed-plate of the machine and to which are secured vertical frame pieces 21 and 22. Supported by these frame pieces is the actuating shaft 23, carrying at one end a pulley 24 which is driven from any suitable source of power by means of a belt 25. An eccentric 26 surrounded by a strap 27 is driven by the other end of this shaft and carries a cam roller 28. The strap 27 is secured to and reciprocates, within the frame 21, a member 29. To this reciprocatory member is pivotally secured two gangs of picker members each gang comprising a jaw 30 (Fig. 12) provided with suitable teeth 31 and a series of adjacent, individual picker jaws 32, (Figs. 10 and 11) coöperating therewith. The upper arms 33 of the picker jaws 32 are sufficiently resilient to accommodate various thicknesses of material grasped between them and the coöperating teeth 31. The ends of these arms are located in suitable grooves 34 of the yoke 35 acting as abutments to hold the said jaws in position, a slight play being permitted the same. These jaws 32 may be readily withdrawn by removing the cover 36, and broken or defective jaws can thus be readily replaced. The members 30 of the two gangs are connected to each other by means of a spring 37; and each carries a suitable roller 38 rotatable upon a shaft 39 mounted in the said members, the roller 38 preferably projecting slightly through a suitable opening 40 made therein. The two gangs of picker members are staggered with respect to each other. As the member 29 is reciprocated through the action of the eccentric 26 and strap 27, the aforesaid gangs of pickers will be correspondingly reciprocated and brought to bear upon the carpet 41 fed over the feed roller 42 upon the bed-plate 20. During the descent of the picker jaws the same remain open; but, upon reaching the carpet, they are brought together in the following manner to grasp the nap. The cam-roller 28 rotating with the eccentric 26 bears upon a cam surface 44 carrying a vertically reciprocable rod 45. This rod is guided in the yoke 35 and in a split guide 46 one-half of which is secured to the member 29 and the other half to the cover 36. The lower end of this rod is adapted to pass between the rollers 38 of the said picker members 30, as the said cam surface is depressed by the cam-roller 28. The operations are so timed that as the member 29 is depressed and the gangs or picker jaws reach the carpet, the said rod 45 will also have descended sufficiently to enter between the rollers 38 and spread apart the jaws 30 in opposition to the spring 37, the rod 45 then being held in this wedged position during a portion of the upward movement of the member 29. The nap is thus grasped by the said picker members and withdrawn from the carpet upon the upward movement of the member 29.

The friction between the lower end of rod 45 and the rollers 38 is sufficient to hold the said rod between the rollers 38 in opposition to a spring 47 which tends to draw said rod upwardly after the cam roller 28 leaves the cam surface 44. To trip this rod, an arm 48 extending from the cam surface 44 is provided, and is adapted to be wiped by the cam-roller 28, lifting thereby the rod 45 out of engagement with the rollers 38. This permits the rod, as well as the cam surface 44, to be drawn upwardly under the action of spring 47 into normal position where the same remains until again depressed by the cam roller 28 to begin a new cycle. As the rod 45 is released from between the rollers 38, the jaws 31 are drawn together under the action of spring 37 thus opening the gangs of picker jaws and releasing therefrom the nap which has been plucked from the carpet. The freed nap is drawn into a hood 50 by means of a suitable suction device (not shown), and is removed from the machine through an opening 51 in the bed-plate 20.

In order to insure the freeing of the nap from the picker jaws I prefer to provide a stripping finger 55 for each of said gangs. These fingers are part of rods 56 which pass through a bracket 57 secured to the frame 21, and each rod is provided with a collar 58 resting, in the starting position (Fig. 1), upon the cover 36. A coiled spring 59 surrounds each of the rods 56, being held between the said collar 58 and bracket 57; and a coiled spring 60 surrounds each of these rods above the bracket 57, adjustable nuts 61 being provided at the upper end of each rod. As the member 29 is depressed, these rods and fingers move downwardly with same to an extent determined by the degree of compression of the springs 59, but do not follow the same nor the jaws all the way. The collars 58 are in their extreme position free of the cover 36, and the jaws 31, 32 will, in closing, finally lock or hold the fingers 55 between them. The nuts are adjusted to make contact with the free ends of the springs 60 to compress the same to the desired degree. As the member 29 again ascends, the fingers 55 and rods 56 move upwardly, being carried by the picker jaws, and the springs 59 are thereby compressed. As soon as the picker jaws separate, as previously set forth, the fingers 55 are shot downwardly under the action of the springs 59 and remove any adhering nap. The springs 60, which are compressed by the nuts 61 as the fingers 55 are shot downwardly, serve to return the fingers to normal position.

To automatically feed the carpet to the picker jaws I have provided means operated from the shaft 23 to automatically rotate the feed roller 42. To this end I provide upon the shaft 70 of said feed roller 42 a ratchet wheel 71, which is advanced in a step by step movement by a spring pressed advancing pawl 72 and locked against return movement by a locking pawl 73 secured to the under side of the bed-plate 20. The advancing pawl 72 is pivoted to a slotted arm 74 loosely mounted upon the shaft 70. This arm 74 is rocked from the shaft 23, to advance the wheel 71 through pawl 72, by means of a spring drawn arm 75. A pin 76 at one end of this arm works in the slot 77 of the arm 74 and the other end is provided with a slot 78 which fits about the shaft 23. A cam 80 is keyed to the shaft 23 adjacent to the arm 75 and makes contact with a roller 81 secured to the said arm 75. As the cam 80 is rotated with the shaft 23, the roller 81 is suddenly released, thereby permitting the arm 75 to be drawn toward the shaft 23 under the action of a spring 82 which is connected to the said arm 75 and to the frame 21. This causes the arm 74 to be rocked backwardly; and, as the cam forces the roller 81 and thereby the arm 75 downwardly, the ratchet wheel 71 is advanced through the action of the pawl 72.

To prevent the carpet from being drawn up during the plucking, a suitable holding bar 90 is provided between the two gangs of pickers. The tension of this bar is controlled by means of a thumb nut 91 which bears against a coiled spring 92 located between the said bed-plate 20 and the said thumb nut 91 and surrounding a bolt 93. Suitable spring pressed feet 100 are also provided—one where the carpet enters over the roller 42 and the other where the carpet leaves the machine. These feet extend from sleeves 101 loosely mounted upon the shafts 102, and are spring pressed through springs 103 secured at their ends to the frame 21. A pin 104 is fixed to a collar 105 on shaft 102 and works in a groove 106 of the said sleeve 101, limiting the degree of movement of these feet. At the other end of the shaft 102, arms 110 and 111 are respectively attached; and to the arm 110 is attached also a link 112 whose other end is secured to the arm 113 of lever 114 pivoted to the frame 21. The arm 111 is provided with a nose 115, adapted to be engaged by a pin 116 projecting from the lever 114. The feet may be raised to permit said piece of carpet to be inserted by raising the handle 117 of lever 114, the arm 110 being shifted through the link 112 and the arm 111 through the pin 116.

I claim:—

1. In a plucking machine: means to support the material to be plucked; a vertically reciprocating member, and means to reciprocate the same; suitable picker jaws carried by said reciprocating member; a vertically movable rod, and engaging means carried thereby; and means carried by said reciprocating means adapted to contact with said engaging means to depress said rod and bring the said picker jaws together to grasp the surface of said material.

2. In a plucking machine: means to support the material to be plucked; a vertically reciprocating member, and a cam to reciprocate the same; suitable picker jaws carried by said reciprocating member; a vertically movable rod, and a cam carried thereby; and means carried by said reciprocating means adapted to contact with said cam to depress said rod and bring the said picker jaws together to grasp the surface of said material.

3. A machine for removing nap from carpets and the like, comprising: means to support the carpet; a vertically reciprocating member; a cam to reciprocate the same; suitable picker jaws carried by said reciprocating member; a vertically movable rod, and a cam carried thereby; a cam roller carried by said first cam, adapted to make contact with said second cam and depress said rod to bring the said picker jaws together to grasp the nap of said carpet.

4. In a plucking machine: means to support the material to be plucked; a vertically reciprocating member, and means to reciprocate the same; suitable picker jaws carried by said reciprocating member; a vertically movable rod, and engaging means carried thereby; means carried by said reciprocating means adapted to contact with said engaging means to depress said rod and bring the said picker jaws together to grasp the surface of said material; and means to open said picker jaws to release the nap.

5. A machine for removing nap from carpets and the like, comprising: means to support the carpet; a vertically reciprocating member; a cam to reciprocate the same; suitable picker jaws carried by said reciprocating member; a vertically movable rod, and a cam carried thereby; a cam roller carried by said first cam, adapted to make contact with said second cam and depress said rod to bring the said picker jaws together to grasp the nap of said carpet; and means to return said rod to normal position to open said picker jaws to release the nap therefrom after the said reciprocating member has ascended a predetermined distance.

6. A machine for removing nap from carpets and the like, comprising: means to support the carpet; a vertically reciprocating member; a cam to reciprocate the same; two gangs of picker jaws carried by said reciprocating member; a vertically movable rod, and a cam carried thereby; a cam roller carried by said first cam, adapted to make contact with said second cam and depress said rod between said gangs of picker jaws to bring the said picker jaws together to grasp the nap of said carpet; a spring to return said rod and its cam to normal position; an arm extending from said cam adapted to be engaged by said cam roller to trip said rod from between said gangs of picker jaws; and means to open said picker jaws when the said rod is removed from between the same to release the removed nap.

7. A machine for removing nap from carpets and the like, comprising: means to support the carpet; a vertically reciprocating member; means to reciprocate the same; suitable picker jaws carried by said reciprocating member; means, actuated from said means to reciprocate the reciprocating member, to bring the said picker jaws together to grasp the nap of said carpet; means to open said picker jaws to release the nap; and means to strip the nap from said picker jaws.

8. A machine for removing nap from carpets and the like, comprising: means to support the carpet; a vertically reciprocating member; means to reciprocate the same; suitable picker jaws carried by said reciprocating member; means, actuated from said means to reciprocate the reciprocating member, to bring the said picker jaws together to grasp the nap of said carpet; means to open said picker jaws to release the nap; and stripping fingers between said picker jaws, adapted to follow the said jaws during a part of the descent of same, and to be held thereby until the same are again opened; and means to extend said fingers, when the said picker jaws are opened, to strip the nap therefrom.

9. In a plucking machine: means to support the material to be plucked; a vertically reciprocating member, and means to reciprocate the same; suitable picker jaws carried by said reciprocating member; a vertically movable rod, and engaging means carried thereby; means carried by said reciprocating means adapted to contact with said engaging means to depress said rod and bring the said picker jaws together to grasp the surface of said material; and means to automatically feed said material to said picker jaws.

10. In a plucking machine: means to support the material to be plucked; a vertically reciprocating member, and means to reciprocate the same; suitable picker jaws carried by said reciprocating member; a vertically movable rod, and engaging means carried thereby; means carried by said reciprocating means adapted to contact with said engaging means to depress said rod and bring the said picker jaws together to grasp the surface of said material; means to automatically feed said material to said picker jaws; and adjustable, spring pressed means to hold said material to said support.

11. In a machine for removing nap from carpets and the like: adjacent gangs of pivoted picker jaws, each gang comprising a plurality of individual adjacent picker jaws, and a plate provided with teeth coöperating with said individual picker jaws; means to yieldingly connect the said plates of pairs of adjacent gangs of picker jaws together; and means to separate the said plates in opposition to the said yielding connecting means.

12. In a machine for removing nap from carpets and the like: adjacent gangs of pivoted picker jaws, each gang comprising a plurality of individual, adjacent picker jaws, and a plate provided with teeth coöperating with said individual picker jaws; a spring connecting the plates of pairs of adjacent gangs of picker jaws; rollers carried by said plates; and means adapted to be inserted between said rollers to separate the said plates in opposition to said spring to close said gangs of picker jaws.

13. A machine for removing nap from carpets and the like, comprising: means to support said carpet; a vertically reciprocating member; means to reciprocate the same; adjacent gangs of picker jaws pivoted to said reciprocating member, each gang comprising a plurality of individual adjacent picker jaws, and a plate provided with teeth coöperating with said individual picker jaws; arms extending from said individual picker jaws; a yoke carried by said reciprocating member and provided with suitable grooves to receive the ends of said arms; a spring connecting the plates of pairs of adjacent gangs of picker jaws; and means, actuated from said means to reciprocate the reciprocating member, adapted to be inserted between said plates in opposition to said spring to close the said gangs of picker jaws.

14. A machine for removing nap from carpets and the like, comprising: means to support the carpet; a vertically reciprocating member; a cam to reciprocate the same; adjacent gangs of picker jaws pivoted to said reciprocating member, each gang comprising a plurality of individual adjacent picker jaws, and a plate provided with teeth coöperating with said individual picker jaws; arms extending from said individual picker jaws; a yoke carried by said reciprocating member and provided with suitable grooves to receive the ends of said arms; a spring connecting the plates of pairs of adjacent gangs of picker jaws; a vertically movable rod, and a cam carried thereby; a cam roller carried by said first cam, and adapted to make contact with said second cam and depress said rod between said plates in opposition to said spring to close said gangs of picker jaws to grasp the nap of said carpet; and means to return said rod to normal position and to open said gangs of picker jaws to release the nap therefrom, after the said reciprocating member has ascended a predetermined distance.

15. A machine for removing nap from carpets and the like, comprising: means to support the carpet; a vertically reciprocating member; a cam to reciprocate the same; adjacent gangs of picker jaws pivoted to said reciprocating member, each gang comprising a plurality of individual adjacent picker jaws, and a plate provided with teeth coöperating with said individual picker jaws; arms extending from said individual picker jaws; a yoke carried by said reciprocating member and provided with suitable grooves to receive the ends of said arms; a spring connecting the plates of pairs of adjacent gangs of picker jaws; a vertically movable rod, and a cam carried thereby; a cam roller carried by said first cam, adapted to make contact with said second cam to depress said rod between said plates, in opposition to said spring, to close said gangs of picker jaws to grasp the nap of said carpet; a spring to return said rod and its cam to normal position; an arm extending from said cam, adapted to be engaged by said cam roller to trip said rod from between said gangs of picker jaws to open the same to release the nap therefrom, after the said reciprocating member has ascended a predetermined distance.

Signed at Harrison, in the county of Hudson and State of New Jersey this fifth day of February A. D. 1910.

THEODORE MEAD, Jr.

Witnesses:
 FRANK HOLZER,
 CHARLES F. JOHNSON.

Copies of this patent may be obtained for five cents each, by addressing the "Commissioner of Patents, Washington, D. C."